United States Patent

[11] 3,586,289

| [72] | Inventor | Werner K. Priese |
| | | Tower Lake, Ill. |
| [21] | Appl. No. | 878,606 |
| [22] | Filed | Nov. 21, 1969 |
| [45] | Patented | June 22, 1971 |
| [73] | Assignee | Hills-McCanna Co. |
| | | Carpentersville, Ill. |

[54] VALVE UNIT AND STEM PACKING ASSEMBLY
10 Claims, 3 Drawing Figs.

[52] U.S. Cl............................................. 251/214,
 277/144, 277/165
[51] Int. Cl............................................. F16k 41/16
[50] Field of Search............................. 251/214,
 304, 309, 315; 277/144, 165, 188

[56] References Cited
UNITED STATES PATENTS
| 3,239,191 | 3/1966 | Widera | 251/214 X |
| 3,300,225 | 1/1967 | Shepler | 277/188 X |
| 3,445,087 | 5/1969 | Priese et al. | 251/214 X |
| 3,477,731 | 11/1969 | Workman | 277/188 X |

Primary Examiner—M. Cary Nelson
Assistant Examiner—David R. Matthews
Attorney—Olson, Trexler, Wolters & Bushnell ABSTRACT: A valve unit of the type including a body member having a passage therethrough and an aperture found therein transverse to said passage. A valve element disposed in said body for rotation between the valve-open and valve-closed positions by a stem extending outwardly of said body through said aperture. Sealing means for preventing leakage past said aperture, said sealing means including at least one packing assembly comprised of a wedge ring having a frustoconical inner peripheral surface, and an O-ring disposed radially inward of said wedge ring. The seal assembly is carried in a chamber defined partially by a relatively movable member and a stationary seat which encircles said stem, such that said wedge ring is effective when compressed to force the O-ring into sealing position relative to the clearance space between said seat and said stem.

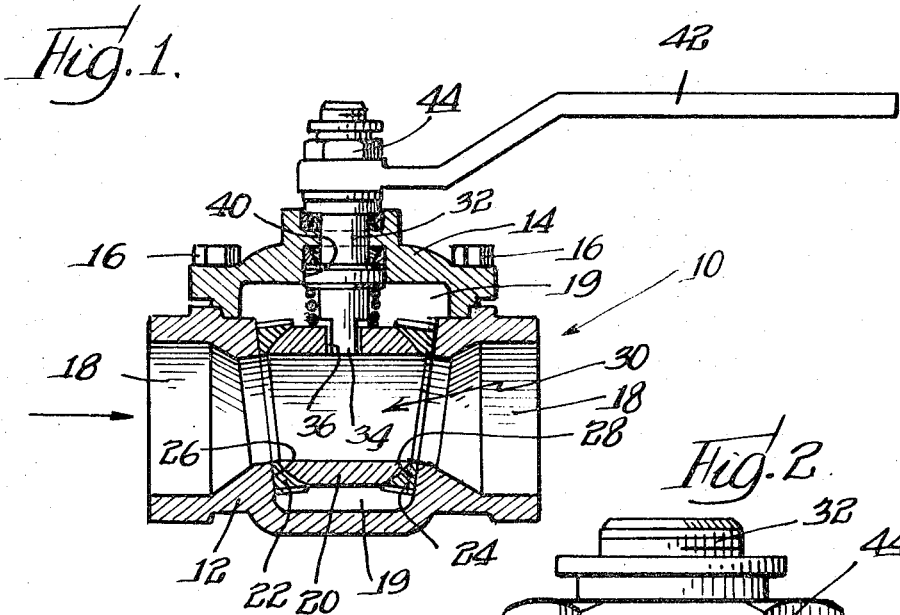
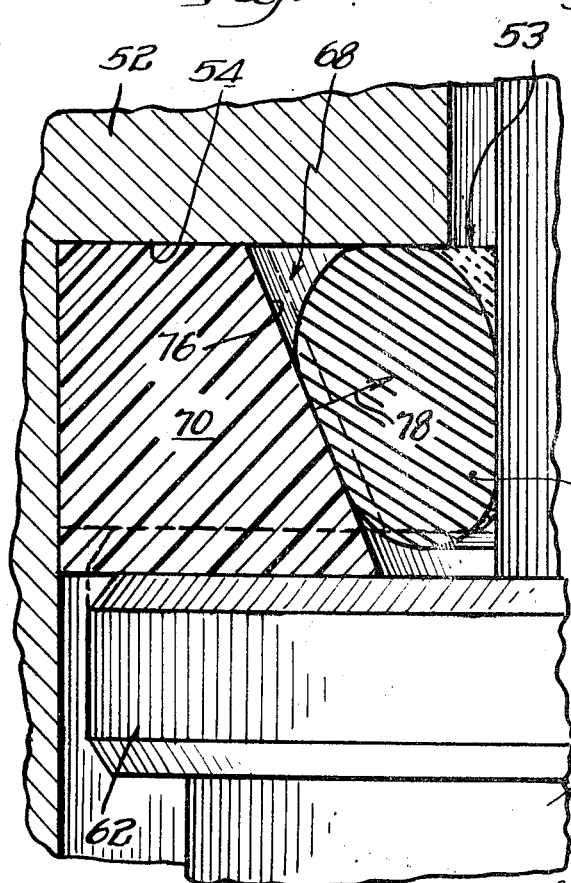
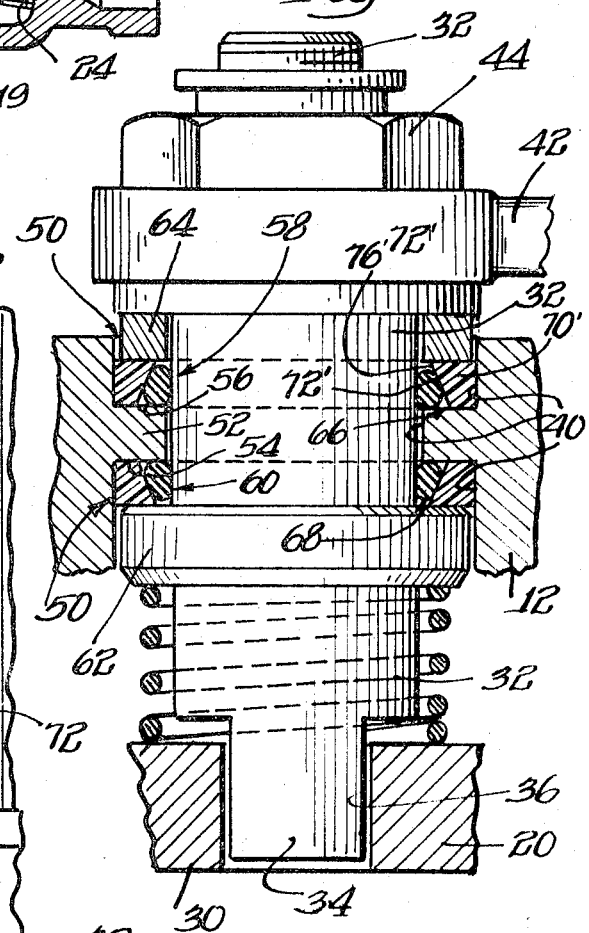
PATENTED JUN 22 1971   3,586,289
Fig. 1.
Fig. 2.
Fig. 3.
Inventor
Werner K. Priese
By: Olson, Trexler, Wolters and Bushnell
attys.

VALVE UNIT AND STEM PACKING ASSEMBLY

BACKGROUND OF THE INVENTION

The present invention relates to valve units, and more specifically to valve units of the type having a stem element connected to a flow control member, which is adapted to be rotated between a valve-open and a valve-closed condition.

A valve unit construction of the general type to which the present invention relates, normally includes a body member having internal chamber within which is mounted a flow control or valving element. The valving element is rotated between a valve-open condition and a valve-close condition by a stem which is operatively connected to said element and extends outwardly of the body member through an aperture or passageway formed therein. For effective operation, sealing or packing means must be provided to prevent the leakage of fluid, or the like, through the clearance space between said stem and the inner periphery of the aperture wall. Packing means of this general type are generally such that they employ a movable gland or compression ring which, after assembly places the individual elements of the packing means in compression to effect the desired seal. Packing arrangements of this general type are often referred to in the art as "stuffing box seals."

Valve units of the general type under discussion are used in a wide variety of applications. One such application for these valve units, where nothing short of flawless, leak-free operation can be tolerated is with regard to the chemical industry. In this instance, the valve units form part of the apparatus employed in the practicing of a wide range of chemical processes.

When in service, these valve units are not always employed in situations where they are conducting fluids under positive pressures, on the contrary these valves are often employed as control means for fluid lines wherein a strong vacuum exists. As a result of this, the stuffing box seal, or valve stem packing assembly must be such that it can handle both positive and negative pressures within the valve, with equal facility.

Accordingly, in order to accommodate the above-mentioned situation, and to avoid problems inherent in known prior art assemblies, the valve unit of the present invention provides opposed packing arrangements which are effective to seal in opposite directions. That is to say, while both packing assemblies will provide a certain degree of sealing action under conditions of a relatively low positive or negative pressure, under conditions wherein extremes are encountered one of the packing assemblies is designed to accommodate the high negative pressure or vacuum situation, while the other is designed to seal against high positive pressure situations.

DESCRIPTION OF THE DRAWINGS

FIG. 1 is a sectional view of one type of valve unit which may utilize the present invention.

FIG. 2 is an enlarged, fragmentary, sectional view of the stem element of the valve unit of FIG. 1, and illustrates in greater detail the novel packing assembly of the present invention.

FIG. 3 is a fragmentary, sectional view on even a larger scale than FIG. 2, illustrating the construction of one of the packing assemblies of the novel sealing arrangement of the present invention.

DESCRIPTION OF THE ILLUSTRATED EMBODIMENT

Referring now more specifically to the drawings, wherein like elements designated are by the same reference characters throughout, FIG. 1 illustrates a valve unit 10 incorporating features of the present invention. While the valve unit 10 is a ball valve, and the present invention will be described with regard thereto, it should be noted that the specific type of valve unit employed is immaterial. That is to say, the novel sealing assembly to be described in detail hereinafter may be employed with valve units of various types and is not limited to use with the ball valve.

More specifically, the valve unit 10 comprises a main body section 12 having a bonnet 14 removably secured thereto by screws 16 or the like. The body 12 has a pair of aligned passages 18 formed therein which open to an interior chamber 19 defined by the body member 12 and said bonnet 14. A rotatable ball element 20 is disposed in said chamber 19 intermediate the respective passages 18. Said ball element 20 is supported for rotation by a pair of axially spaced annular seats 22 and 24 which engage the peripheral surface of a ball, and are in turn supported by annular seat support surfaces 26 and 28 defined on the body member 12.

The ball element 20 has a passageway 30 formed therein which is adapted to be aligned with the passageways 18 to define the valve-open condition, as illustrated in FIG. 1. On the other hand, when the ball 20 is rotated 90 degrees from the position shown, the passageway 30 no longer is aligned with the passageways 18 and the transmission of fluid through the body is blocked, thus defining the valve-closed condition. In this latter condition the downstream seat 24 provides the sealing action which prevents fluid from passing through the valve 10.

In order to manipulate or rotate the ball element 20 between the valve-open condition and the valve-closed condition discussed above, operating means are provided. Said operating means include a valve stem 32 having an axially projecting blade element 34 that is loosely disposed in a slot 36 formed in the upper portion of the ball 20. The stem 32 extends outwardly through an aperture 40 formed in the bonnet 14 such that rotation of the stem 32 affects similar movement of the ball member 20. Further, in this regard a handle or lever 42 is nonrotatably mounted on the outer exposed end portion of the stem and is secured thereon by a retainer nut 44 to facilitate the operation of the valve 10.

With the valve unit of the general type discussed above, indexed to the closed condition, the pressure in the fluid line be it positive or negative exerts a force on the ball tending to move it axially of the passages 18. Accordingly, due to this fluid will enter the chamber 19 thus necessitating a provision of sealing means to prevent leakage outwardly between the inner periphery of aperture 40 and the surface of stem 32. In FIG. 2 this sealing assembly is designated generally 50, and will be discussed in greater detail hereinafter with regard to FIGS. 2 and 3.

Turning then to FIG. 2, sealing assembly 50 of the present invention is illustrated in detail. During the discussion to follow, it should be kept in mind that the sealing means 50 are designed to provide a sealing action under conditions of extreme positive or negative pressures in the passages 18 and correspondingly chamber 19.

The intermediate or minimum dimension of aperture 40 formed in bonnet 14 is provided by an inwardly extending annular flange 52, which encircles stem 32. The disposition of annular flange 52 intermediate the opposite ends of the aperture 40 is effective to provide a pair of spaced, oppositely facing annular wells or seats 54 and 56. Each said well or recess accommodates one of the packing assemblies, designated generally 58 and 60, which will be detailed more fully hereinafter.

On a portion of stem 32 disposed within chamber 19 there is provided an annular stem flange 62. In addition, a compression element or ring 64 is slidably carried by the stem 32 exteriorly of the unit 10 between the bonnet 14 and the lever 42. Accordingly, with reference to FIG. 2, it can be seen that flange 62 and compression element 64 cooperate with the wells or seats 54 and 56 to provide a pair of spaced annular chambers 66 and 68. Disposed within the respective chambers 66 and 68 are the packing assemblies 58 and 60.

As was discussed previously, the packing assemblies 58 and 60 function individually to provide a sealing action during low-pressure conditions. The specific construction of said assemblies 58 and 60, as will be discussed more completely hereinafter, is designed such that the upper assembly 58 provides an effective seal during conditions of extreme negative pressure, or vacuum, while the lower assembly 60 seals against high-pressure conditions in said valve.

Considering now FIG. 3, there is illustrated the lower seal assembly 60. The specific construction of the upper assembly 58 is substantially identical to that of lower assembly 60, with the exception that they are designed to seal against leakage past the flange 52 in opposite directions. Accordingly, a detailed discussion of the upper assembly 58 will be omitted, with the elements thereof corresponding to those of assembly 60 being designated by like reference characters primed.

The seal assembly 60, illustrated in detail in FIG. 3 comprises a wedge ring 70 made of tetrafluoroethylene polymer or some other similar material capable of being deformed somewhat under pressure, and in O-ring 72 disposed radially inward of the wedge ring 70 and fabricated from a fluoro elastomer. The fluoro elastomer will not swell upon being subjected to liquids, and possesses high corrosive and heat-resistant properties, making it ideal for use in chemical processes.

Wedge ring 70 is generally trapezoidal in section the inner periphery of which is defined by a frustoconical surface 76 which engages the O-ring 72. Regarding the frustoconical surface 76 of the wedge ring 70, as well as the corresponding surface 76' of the wedge ring 70' for assembly 58, said frustoconical surfaces converge in opposite directions toward the stem 32 and away from their respective seats 54 and 56.

Upon initial makeup or assembly, the wedge rings 70, 70' and the O-rings 72, 72' are positioned as illustrated in FIG. 2. Next, the nut 44 is tightened which effects movement of the compression ring 64 axially of the stem to reduce the distance between said ring 64 and the stem flange 62. When this happens, the axial lengths of the respective seal assembly receiving chambers 66 and 68 are also reduced, with the stem flange 62 and compression ring 64 engaging the wedge rings 70 and 70' respectively, to compress said rings against the seats or shoulder defined by flange 52.

Upon compression of the wedge rings 70 and 70' their frustoconical surfaces 76 and 76' tend to move inwardly, as indicated by the dotted outline in FIG. 3. This radially inward movement of the surfaces 76 and 76' exerts a deforming pressure on the fluoro elastomer O-rings 72 and 72' in the direction represented by arrow 78. This deforming pressure forces the mass of the respective O-rings 72 and 72' radially inward toward the inner peripheral edges of flange 52, as indicated at 53 in FIG. 3, thus sealing the clearance space between said flange 52 and the stem 32.

Considering first, the conditions that exist when a high fluid pressure exists in the valve 10, it should be noted that the lowermost surface of the stem flange 62, as well as the wedge ring 70 of the seal assembly 60 will be exposed to said pressure. Accordingly, this pressure tends to force the stem flange upwardly to further compress the wedge ring 70. Thus, by the same mechanism of forces previously discussed regarding initial makeup, this upward movement tends further force the O-ring toward the clearance space between flange 52 and the stem 32 to provide a stronger and effective sealing action. Thus, it can be seen that the higher the pressure, the greater the force exerted on the O-ring, and correspondingly the tighter the seal achieved. Also, it should be noted that a measure of sealing is afforded by the tetrafluoroethylene polymer wedge ring 70 upon compression between the stem flange 62 and the body flange 52.

The opposite of the condition discussed above, results during the existence of a high vacuum in the valve, and this is accommodated by the upper seal assembly 58. In this regard, when a vacuum or negative pressure exists in the valve atmospheric pressure would bear on both the wedge ring 70' and the compression ring 64. Thus, as the pressure differential increased, so would the compressive force on wedge ring 70' which tends to extrude the O-ring into the clearance space between flange 52 and stem 32. Thus, it can be seen that the operation of assembly 58 is identical to that of assembly 60, except that it operates in a different direction.

In short, the disclosed packing arrangement for the valve stem is an opposed type of seal construction which utilizes and controls the distorting forces available during conditions of extremely high positive or negative pressure to provide the maximum sealing action.

While a preferred embodiment of the present invention has been shown and described, it is envisioned that those skilled in the art may effect various structural changes, modifications or rearrangements without departing from the spirit and scope of the invention as defined by the appended claims. In this regard, it should be noted that the sealing or packing arrangement 50 need not be limited to use with a ball valve of the type illustrated, nor need it be employed solely with a ball valve. On the contrary, the packing arrangement of the present invention may be used where ever it is desirable to back seat a stem member protruding from a valve body, be it a plug valve, ball valve, or any other type of valve unit.

I claim the invention as follows:

1. A valve unit comprising: a body member having a fluid passageway therethrough and an aperture formed therein which intersects said passageway; a valve element disposed within said body member and being rotatable between a valve-open position and a valve-closed position; a stem interconnected with said valve element and extending outwardly through said aperture formed in said body member, said stem being rotatably mounted relative to said body member for affecting rotation of said valve element; sealing means for preventing the passage of fluid outwardly of said body member along said stem, said sealing means including at least one seal assembly comprised of a wedge ring and an O-ring disposed radially inward of said wedge ring; and a seal assembly receiving chamber which encircles said stem and is defined by a seat surface for said assembly and a relatively movable member engaged with said wedge ring to compress said ring against the seat surface; said wedge ring having a frustoconical inner peripheral surface converging toward said stem in a direction away from said seat surface such that upon application of compressive forces to said wedge ring, said O-ring is forced toward the inner edge of said seat surface to seal the clearance space between the inner periphery of said surface and said stem.

2. The combination as defined in claim 1, wherein a pair of said sealing assemblies and seal assembly receiving chambers are provided along the length of said stem the frustoconical surface of the innermost seal assembly converges toward the inner end of said stem, while the frustoconical surface of the outer assembly converges toward the outer end of said stem.

3. The combination as defined in claim 2, wherein said body member includes an annular flange disposed intermediate the ends of said aperture to define a pair of oppositely facing shoulders, said shoulders providing the seat surface for the respective assemblies.

4. The combination as defined in claim 2, wherein the relatively movable member which defines the innermost one of said seal chambers is provided by a flange formed on said stem inwardly of said body, and said relatively movable member for the other said seal assembly receiving chamber being provided by a compression ring carried by said stem.

5. The combination as defined in claim 1, wherein said wedge ring is formed from an elastically compressible, plasticlike material possessing chemical and heat-resistant properties.

6. A valve unit comprising a body member having a fluid passageway extending therethrough and an aperture formed therein transverse to said passageway, a valve element disposed in said body member for movement between a valve-open condition and a valve-closed condition; a stem interconnected with said valve element and extending outwardly of said body through said aperture for imparting movement to said valve element, and sealing means to prevent the passage of fluid through said aperture along said stem; the improvement wherein said sealing means includes: at least one seal assembly comprised of an annular wedge ring having a frustoconical inner peripheral surface and and O-ring positioned radially inward of said wedge ring and engaged by said frustoconical surface; and a seal-receiving chamber for said assembly, said chamber being defined by a seating surface for said assembly on said body in encircling relation to said stem, and a relatively movable member engaged with said wedge ring to compress said ring against said surface, such that upon the application of compressive forces to said wedge ring, said O-ring will be force into the clearance space between said seating surface and said stem to provide an effective stem seal.

7. The combination as defined in claim 6 wherein said frustoconical surface converges radially inward toward said stem in a direction away from said seating surface.

8. The combination as defined in claim 6, wherein said sealing means includes two of said sealing assemblies and said body member includes an annular flange disposed intermediate the ends of said aperture to define a pair of oppositely facing annular shoulders, with one of said shoulders providing the seating surface for the respective assemblies.

9. The combination as defined in claim 8, wherein the frustoconical surfaces of each wedge ring converge radially inward toward said stem in a direction away from its respective seating surface.

10. The combination as defined in claim 8 wherein the relatively movable member for one said sealing assembly receiving chamber is defined by a flange formed on said stem inwardly of said body, and said relatively movable member for the other said seal assembly receiving chamber being provided by a compression ring slidably mounted on said stem.

PO-1050
(5/69)

UNITED STATES PATENT OFFICE
CERTIFICATE OF CORRECTION

Patent No. 3,586,289      Dated June 22, 1971

Inventor(s) Werner K. Priese

It is certified that error appears in the above-identified patent and that said Letters Patent are hereby corrected as shown below:

Column 4, line 61, "plasticlike material possessing chemical and heat-resistant" should read --plasticlike material, and said O-ring is formed from a fluro elastomeric material possessing chemical and heat-resistant --

Signed and sealed this 28th day of December 1971.

(SEAL)
Attest:

EDWARD M. FLETCHER, JR.      ROBERT GOTTSCHALK
Attesting Officer      Acting Commissioner of Patents